(12) United States Patent
Kuwabara

(10) Patent No.: US 6,779,778 B2
(45) Date of Patent: Aug. 24, 2004

(54) PIPE COUPLING

(75) Inventor: Tetsuya Kuwabara, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 108 days.

(21) Appl. No.: 10/280,522

(22) Filed: Oct. 25, 2002

(65) Prior Publication Data

US 2003/0042734 A1 Mar. 6, 2003

Related U.S. Application Data

(63) Continuation of application No. PCT/JP01/01515, filed on Feb. 28, 2001.

(51) Int. Cl.[7] .............................................. F16L 37/23
(52) U.S. Cl. ...................................... 251/149.9; 285/86
(58) Field of Search .......................... 251/149.1, 149.4, 251/149.6, 149.9; 137/614.06; 285/81, 84, 86, 314, 315, 316

(56) References Cited

U.S. PATENT DOCUMENTS

| | | | | |
|---|---|---|---|---|
| 4,765,657 A | * | 8/1988 | Cruse | 251/149.9 |
| 4,924,909 A | * | 5/1990 | Wilcox | 137/614.05 |
| 5,211,197 A | * | 5/1993 | Marrison et al. | 251/149.6 |
| 5,290,009 A | | 3/1994 | Hellmann | |
| 5,390,963 A | * | 2/1995 | Namekawa | 285/86 |
| 5,445,358 A | * | 8/1995 | Anderson | 251/149.6 |
| 5,451,031 A | * | 9/1995 | Purvis et al. | 251/149.9 |
| 5,630,570 A | | 5/1997 | Lacroix et al. | |
| 5,634,624 A | | 6/1997 | Lacroix et al. | |
| 6,131,961 A | * | 10/2000 | Heilmann | 285/316 |

FOREIGN PATENT DOCUMENTS

| | | |
|---|---|---|
| FR | 2786848 | 1/1999 |
| JP | 51148723 | 11/1976 |
| JP | 52061539 | 5/1977 |
| JP | 55166592 | 12/1980 |
| JP | 8233182 | 9/1996 |
| JP | 120964 | 4/2000 |
| WO | WO9409304 | 4/1994 |
| WO | WO0032976 | 6/2000 |

* cited by examiner

*Primary Examiner*—David A. Scherbel
*Assistant Examiner*—Eric Keasel
(74) *Attorney, Agent, or Firm*—John P. White; Cooper & Dunham LLP

(57) ABSTRACT

A pipe coupling comprises a socket including a valve body, socket body having holes, lock balls stored in the holes for pressing the lock balls radially inward at an advanced position and for releasing the lock balls at a retracted position, and a plug having an engaging groove and being adapted to open the fluid passage when the plug is engaged with the socket. The holes in the socket include first and second holes individually extending in the axial direction, the first holes extending closer to the distal end side than the second holes. The valve body is returned to a position in which the fluid passage is closed, when the lock balls are located on the extreme distal end side of the first holes.

8 Claims, 10 Drawing Sheets

PIPE COUPLING

CROSS-REFERENCE TO RELATED APPLICATIONS

This is a Continuation Application of PCT Application No. PCT/JP01/01515, filed Feb. 28, 2001, which was not published under PCT Article 21(2) in English.

BACKGROUND OF THE INVENTION

1. Field of the Invention

The present invention relates to a pipe coupling comprising a socket having therein a valve body that opens and closes a fluid passage inside and a plug that moves the valve body in the socket, thereby allowing the fluid passage to open.

2. Description of the Related Art

In general, a pipe coupling of this type is provided with a distal end portion having a plurality of holes arranged at spaces in the circumferential direction, a plurality of lock balls stored in these holes for radial sliding motion, and a sleeve mounted on the outer periphery of the socket for movements in the axial and circumferential directions. This sleeve has a convex pressure surface and concave release surfaces on its inner peripheral surface. It presses the lock balls radially inward by means of the convex pressure surface when it is advanced, and releases the lock balls from the hold by means of the concave release surfaces when it is retreated. Further, the plug includes a distal end portion formed having an engaging groove in which the lock balls can be fitted. When this distal end portion is fitted in the distal end portion of the socket, a valve body in the socket moves to allow a fluid passage to open. As this is done, the lock balls are fitted in the engaging groove, and the sleeve maintains the engagement of the engaging groove and the lock balls.

In the pipe coupling of this type, if a fluid remains in the plug when the socket and plug are to be separated, the plug may possibly jump out under the pressure of the fluid when the socket and the plug are separated. Accordingly, there is a demand for a pipe coupling in which a socket and a plug can be safely separated in a manner such that a fluid in the plug is allowed to be securely discharged before the separation.

Conventionally, one such pipe coupling is described in Jpn. Pat. Appln. KOKAI Publication No. 8-233182, for example.

In this pipe coupling, a lock mechanism that makes a male member immovable in the axial direction causes an urged flap valve, which is mounted in a female member, to open when the male member is temporarily fitted in the female member. A longitudinal claw in a ring-shaped member is caused to engage an annular recess in the body of the male member by the use of elastic means. If a bush moves in the axial direction, the claw is disengaged from the recess, whereupon the male member is released. The female member includes a ring-shaped safety member that has a claw. If the bush is moved in a first axial direction, the male member is made immovable in an intermediate position by means of the claw of the safety member. In this intermediate position, the urged flap valve is closed, and a compressed fluid confined in a lower-stream-side pipe that cooperates with the male member is discharged to the outside. If the bush is moved in a second axial direction that is opposite to the aforesaid direction, moreover, the ring-shaped safety member is controlled so that the male member is released completely.

According to the pipe coupling described above, the construction is complicated, and a large number of components are required. Therefore, the manufacture is troublesome, so that high cost is entailed. Since the bush moves in the two directions, forward and backward, moreover, the overall length increases correspondingly, so that the structure is inevitably bulky.

BRIEF SUMMARY OF THE INVENTION

The object of the present invention is to provide a pipe coupling, which has a simple construction such that its cost and size can be reduced, and in which the pressure of a fluid can be securely removed before. a socket and a plug are separated from each other.

A pipe coupling of the present invention to achieve the above object comprises: a socket including a socket body having a valve body for opening and closing a fluid passage formed therein and a distal end portion having a plurality of holes arranged at spaces in the circumferential direction, a plurality of lock balls stored in the holes for radial sliding motion, and a sleeve fitted on the outer periphery of the socket body, having a convex pressure surface and concave release surfaces on the inner peripheral surface thereof, and adapted to press the lock balls radially inward by means of the convex pressure surface when in an advanced position and to release the lock balls from the hold by means of the concave release surfaces when in a retreated position; and a plug having a distal end portion formed having an engaging groove in which the lock balls can be fitted and adapted to move the valve body to open the fluid passage so that engagement with the socket can be maintained by means of the lock balls in engagement with the engaging groove when the distal end portion is fitted in the distal end portion of the socket, the holes in the distal end portion of the socket including first and second holes individually extending in the axial direction, the first holes extending closer to the distal end side than the second holes, the sleeve being rotatable over the socket body, having convex press extension surfaces extending from the convex pressure surface toward the distal end, and being adapted to press the lock balls on the distal end side of the first holes by means of the convex press extension surfaces when in a given rotating-direction position and to align the lock balls with the concave release surfaces, thereby releasing the lock balls from the hold by means of the convex press extension surfaces, when rotated from the given position, the valve body being adapted to be released from the engagement with the plug and allowed to return to a position such that the fluid passage is closed when the plug is moved away from the socket so that the lock balls in engagement with the engaging groove are located on the extreme distal end side of the first holes.

According to this pipe coupling, if the sleeve is retreated in order to separate the socket and the plug that are connected to each other, the concave release surfaces of the sleeve move onto the lock balls in the second holes, among the lock balls having so far been pressed radially inward by the convex pressure surface of the sleeve and in engagement with the engaging groove of the plug. Thereupon, the lock balls in the second holes are allowed to leave the engaging groove of the plug. On the other hand, the lock balls in the first holes are still pressed radially inward by the convex press extension surfaces, and are in engagement with the engaging groove of the plug. If the plug in this state is pulled in the withdrawal direction, the lock balls in the first holes move, sliding or rolling on the convex press extension surfaces without being disengaged from the engaging groove of the plug. When they reach the distal end side of the first holes, the lock balls prevent the plug from being further drawn out. When the plug is drawn out to this position, the distal end of the plug leaves the built-in valve body in the socket, and the valve body advances to close the fluid passage in the socket, so that fluid remaining in the plug is discharged to the outside through the gap between the socket and the plug. If the sleeve is rotated in the circumferential direction in this state, the concave release surfaces move onto the lock balls in the first holes, thereby allowing the lock balls to leave the engaging groove of the plug. The socket and the plug can be separated from each other by further drawing out the plug in this state.

Preferably, the sleeve is movable in the axial direction only when in the given rotating-direction position and rotatable only when in the advanced position.

According to this arrangement, if the sleeve is retreated in separating the socket and the plug that are connected to each other, the concave release surfaces of the sleeve move onto the lock balls in the second holes, among the lock balls having so far been pressed radially inward by the convex pressure surface of the sleeve and in engagement with the engaging groove of the plug, so that the lock balls are allowed to leave the engaging groove of the plug. On the other hand, the lock balls in the first holes are still pressed radially inward by the convex press extension surfaces, and are in engagement with the engaging groove of the plug. Since the sleeve cannot be rotated in the circumferential direction when in the retreated position, the lock balls in the first holes are still kept pressed radially inward by the convex press extension surfaces, so that the socket and the plug cannot be separated from each other. Further, the sleeve is allowed to rotate if it is moved to the advanced position. If the sleeve is rotated in this position, the concave release surfaces move onto the lock balls in the first holes, so that the lock balls are allowed to leave the engaging groove of the plug, whereupon the socket and the plug can be separated from each other. Thus, in separating the socket and the plug, operation is needed to return the retreated sleeve to the advanced position and rotate it in the circumferential direction in that position. Therefore, the fluid remaining in the plug in the process of this operation is discharged to the outside through the gap between the socket and the plug, so that the socket and the plug can be separated safely.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
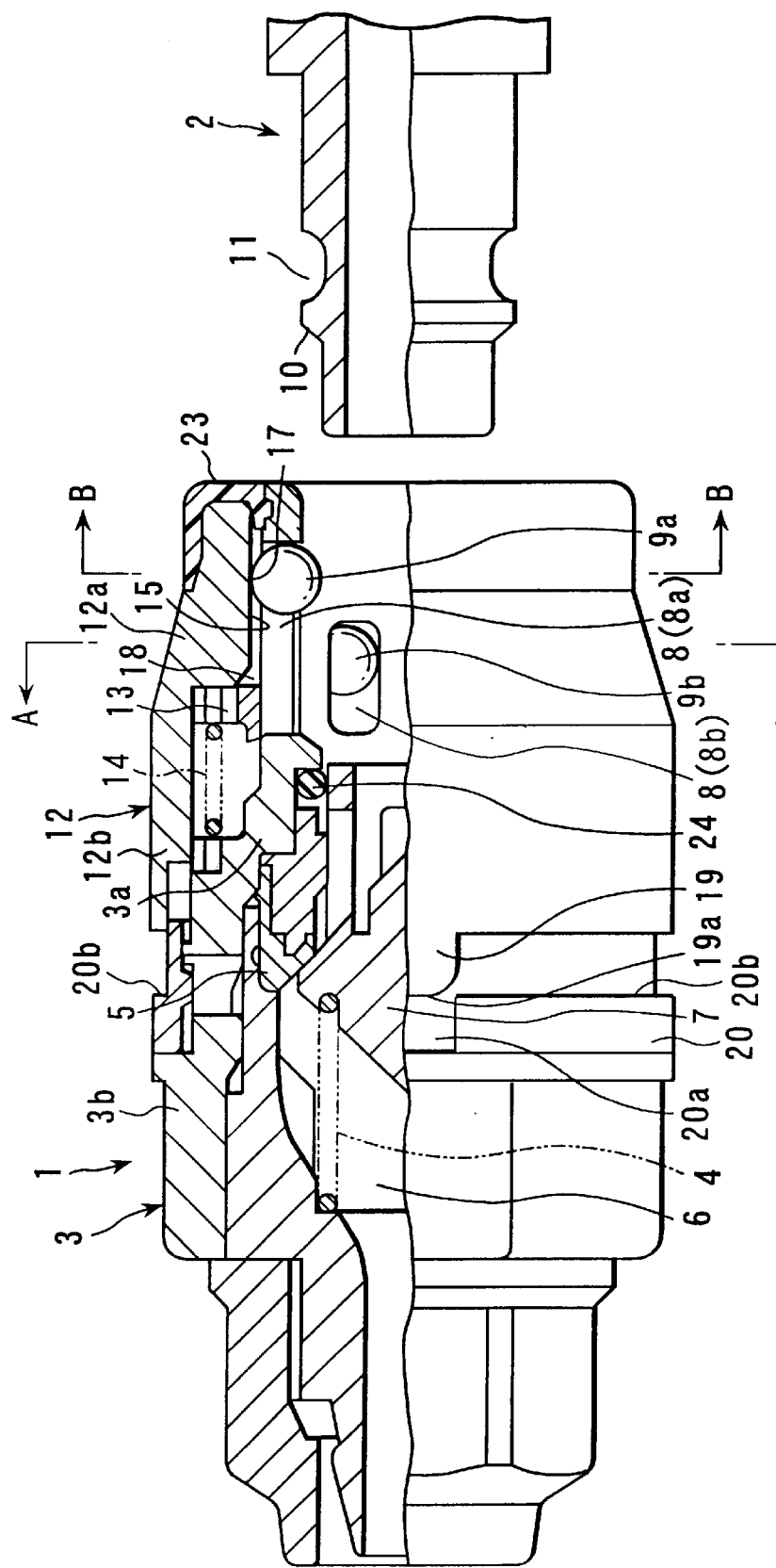
FIG. 1 shows a preferred embodiment of a pipe coupling according to the present invention, the upper half in a quarter sectional view and the lower half in a side view.

A preferred embodiment of a pipe coupling according to the present invention will be described in detail with reference to FIGS. 1 to 4.

In the drawings, numerals 1 and 2 denote a socket and a plug, respectively. The socket 1 is provided with a socket body 3 that has a small-outside-diameter cylinder portion 3a on the distal end side and a large-outside-diameter cylinder portion 3b on the rear end side. The bore of the socket body 3 is provided with a valve body 7, which is urged toward the distal end by means of a spring 4 and can engage a valve seat 5 to close a fluid passage 6 that is formed in the socket body 3. When the plug 2 is inserted, the valve body 7 is pushed to the rear end side and leaves the valve seat 5, thereby allowing the fluid passage 6 to open.

A plurality of lock ball storage holes 8 are formed in the small-outside-diameter cylinder portion 3a of the socket body 3 and arranged at spaces in the circumferential direction. Each of these lock ball storage holes 8 takes the form of a slot that extends in the axial direction, and first lock ball storage holes 8a take the form of slots that extend closer to the distal end side than the other or second lock ball storage holes 8b. In the present specification, the lock ball storage holes 8a formed of slots that extend to the distal end side are referred to as long lock ball storage holes 8a, and the other lock ball storage holes 8b are referred to as short lock ball storage holes 8b.

In the present embodiment, six lock ball storage holes 8 are formed at equal spaces in the circumferential direction in the small-outside-diameter cylinder portion 3a of the socket body 3. Two of them that face across the axis in the radial direction are the long lock ball storage holes 8a.

The respective rear end portions of the long lock ball storage holes 8a and the short lock ball storage holes 8b are set so as to be situated in lock ball release spaces formed on the rear end side of a convex pressure surface on the inner peripheral surface of a sleeve (mentioned later) for lock ball operation when the sleeve is in its advanced position. Further, the distal end side position of the long lock ball storage holes 8a in the axial direction is set so that the distal end of the plug 2 leaves the valve body 7 in the socket 1, thereby allowing the valve body 7 to advance to close the fluid passage 6 in the socket 1, when lock balls 9a in the long lock ball storage holes 8a are situated on the distal end side of the long lock ball storage holes 8a as the plug 2 retreats with the lock balls 9a in engagement with an engaging groove 11 of the plug 2.

Figure 2:
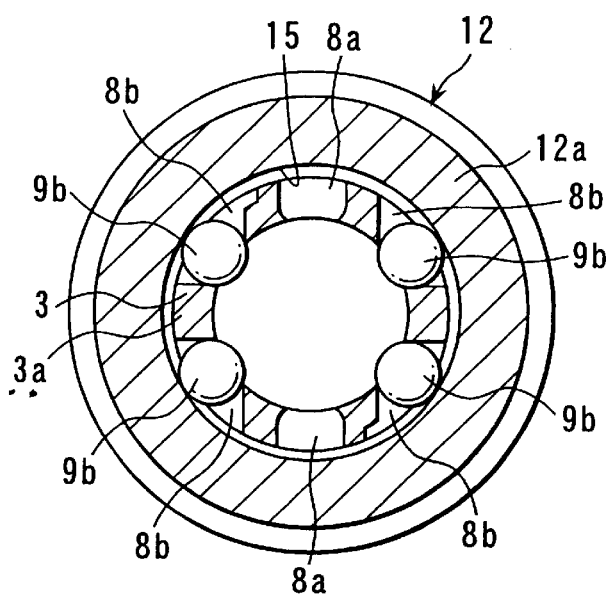
FIG. 2 is a cross-sectional view of a socket taken along line A—A of FIG. 1.
Figure 3:
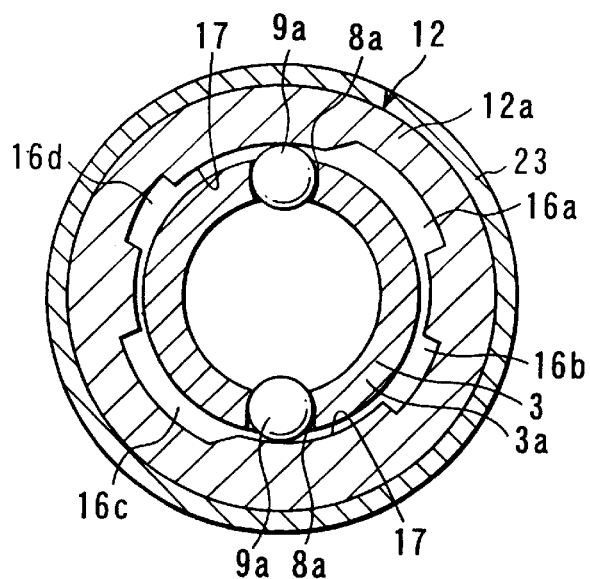
FIG. 3 is a cross-sectional view of the socket taken along line B—B of FIG. 1.

Lock balls 9a and 9b are held in the long lock ball storage holes 8a and the short lock ball storage holes 8b, respectively, so as to be movable in the longitudinal direction (axial direction) and the radial direction. The circumferentially opposite side faces of any of the long lock ball storage holes 8a and the short lock ball storage holes 8b are tapered so that their widths are reduced radially inward (FIG. 2). Thus, the lock balls 9a and 9b partially project from the inner surface on the inner peripheral side of the small-outside-diameter cylinder portion 3a as they are held in the holes. The diameter of each of the lock balls 9a and 9b is a little greater than the wall thickness of the small-outside-diameter cylinder portion 3a.

The lock balls 9a and 9b are designed so that they are pushed by a ring-shaped tapered end face 10 on the distal-end-side outer peripheral surface of the plug 2 to move radially outward when the distal end portion of the plug 2 is inserted into the small-outside-diameter cylinder portion 3a that constitutes the distal end portion of the socket body 3 and so that they can move radially inward to engage the engaging groove 11 on the outer periphery of the plug when the engaging groove 11 is aligned with the lock balls 9a and 9b.

A sleeve 12 for operating the lock balls 9a and 9b is provided on the outer periphery of the socket body 3 so as to be movable in the axial direction and rotatable in the circumferential direction. The sleeve 12 has a small-inside-diameter cylinder portion 12a on its distal end side that can be fitted with the small-outside-diameter cylinder portion 3a and a large-inside-diameter cylinder portion 12b on its rear end side that can be fitted with the large-outside-diameter cylinder portion 3b.

Further, a collar 13 is provided on the outer periphery of the small-outside-diameter cylinder portion 3a of the socket body 3 so as to be situated in the large-inside-diameter cylinder portion 12b of the sleeve 12 and be movable in the axial direction and rotatable in the circumferential direction. The collar 13, which is movable in the axial direction with respect to the sleeve 12, can rotate integrally with the sleeve 12 in the circumferential direction. A coil spring 14 is interposed between the collar 13 and a step portion of the large-outside-diameter cylinder portion 3b of the socket body 3. One end of the coil spring 14 is fixed to the step portion of the large-outside-diameter cylinder portion 3b, and the other end to the collar 13. The coil spring 14 urges the collar 13 toward the distal end and in the circumferential direction. The coil spring 14 also causes the collar 13 to urge the sleeve 12 toward the distal end and in the circumferential direction.

Located between the socket body 3 and the sleeve 12, moreover, is a positioning stopper (not shown) that can settle a given rotating-direction position of the sleeve 12. The sleeve 12 is anchored to the stopper by means of the urging force of the coil spring 14 in the circumferential direction, whereby it is prevented from rotating further and located in the given rotating-direction position.

Furthermore, the sleeve 12 is movable in the axial direction only when it is in the given rotating-direction position and rotatable only when it is advanced to the distal end side. In the present embodiment, an engaging protrusion 19 that has a dimension substantially equal to the axial-movement dimension of the sleeve 12 protrudes axially from the rear end portion of the sleeve 12. On the other hand, an engaging recess 20a that can be engaged by the engaging protrusion 19 of the sleeve 12 is formed in a ring-shaped stepped member 20 on the outer periphery of the large-outside-diameter cylinder portion 3b of the socket body 3.

The engaging protrusion 19 is aligned with the engaging recess 20a to allow the sleeve 12 to retreat when the sleeve 12 in the advanced position is situated in the given rotating-direction position, and prevents the sleeve 12 from rotating in the circumferential direction when the engaging protrusion 19 engages the engaging recess 20a. When the sleeve 12 is in the advanced position, the engaging protrusion 19 is disengaged from the engaging recess 20a. In this state, the sleeve 12 is allowed to rotate in the circumferential direction. When the sleeve 12 is rotated from the given rotating-direction position, the engaging protrusion 19 and the engaging recess 20a cease to be aligned with each other, whereupon a distal end portion 19a of the engaging protrusion 19 abuts against an end portion 20b of a large-diameter step portion, thereby preventing the sleeve 12 from retreating.

Figure 4:
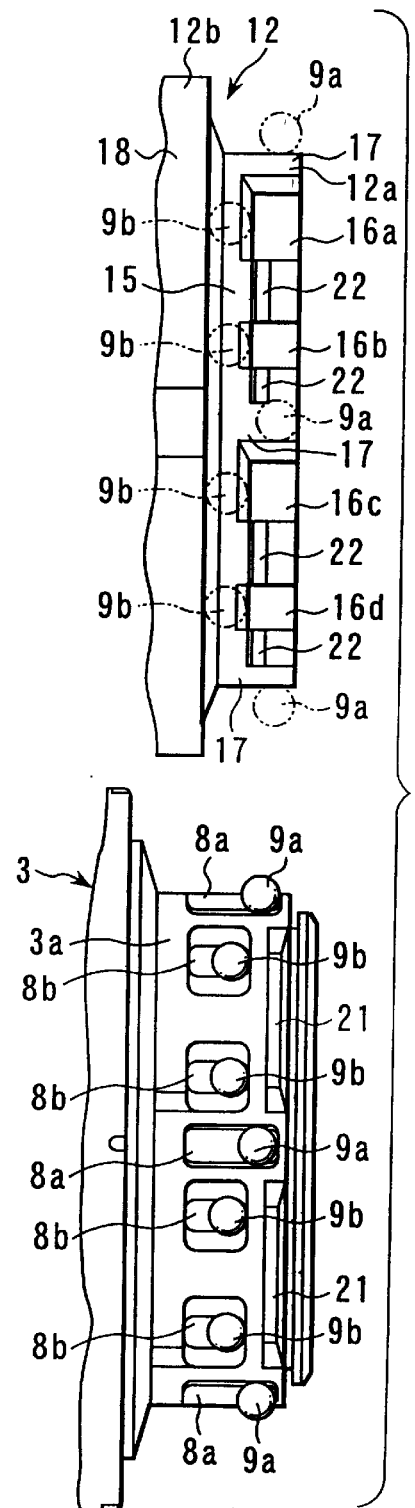
FIG. 4 is a view illustrating the relative positions of the socket, a sleeve, and lock balls, obtained by developing the outer peripheral surface of the distal end portion of the socket and the inner peripheral surface of the distal end portion of the sleeve of FIG. 1.
Figure 5:
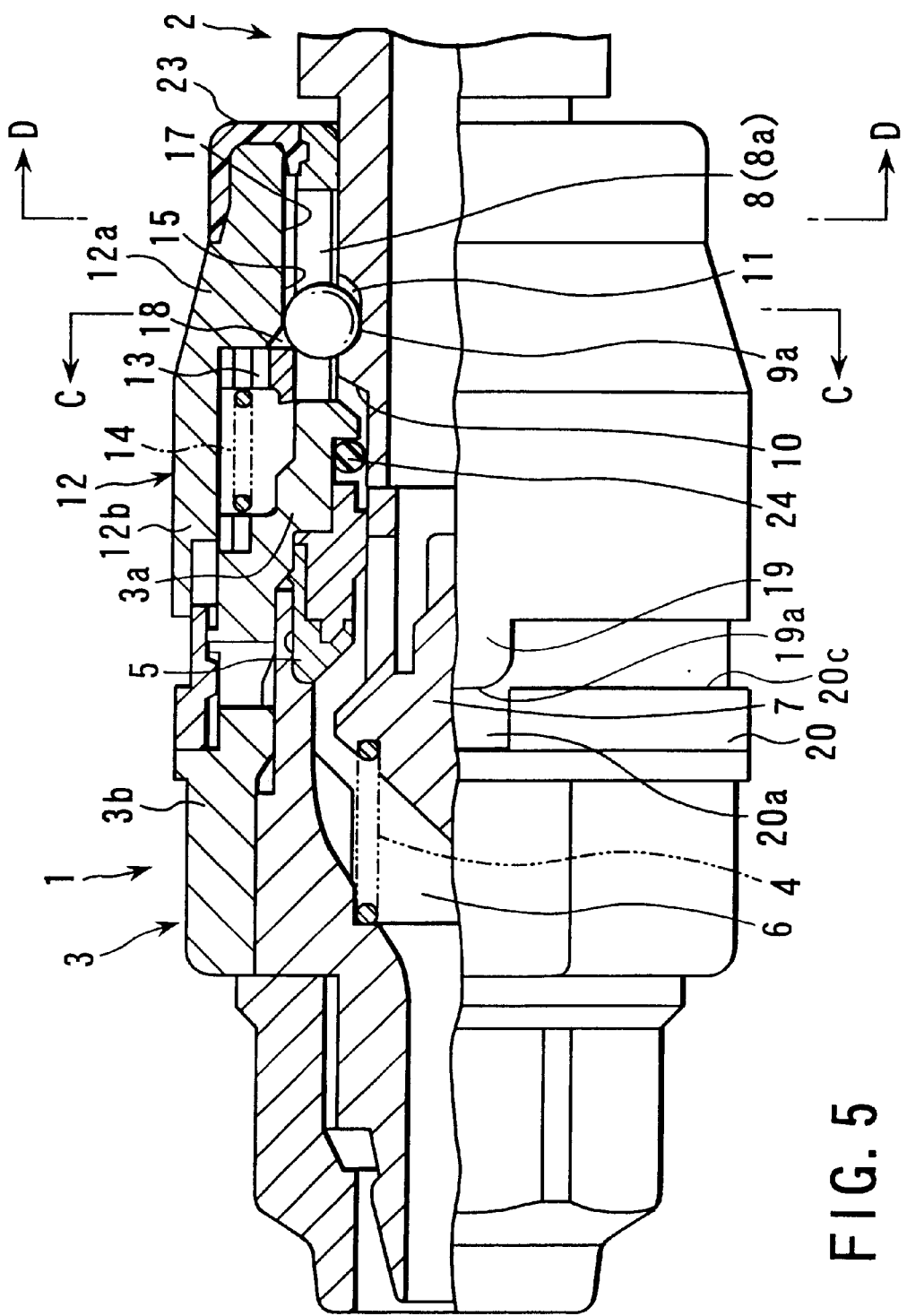
FIG. 5 is a view similar to FIG. 1, showing the way the socket and the plug are connected.
Figure 6:
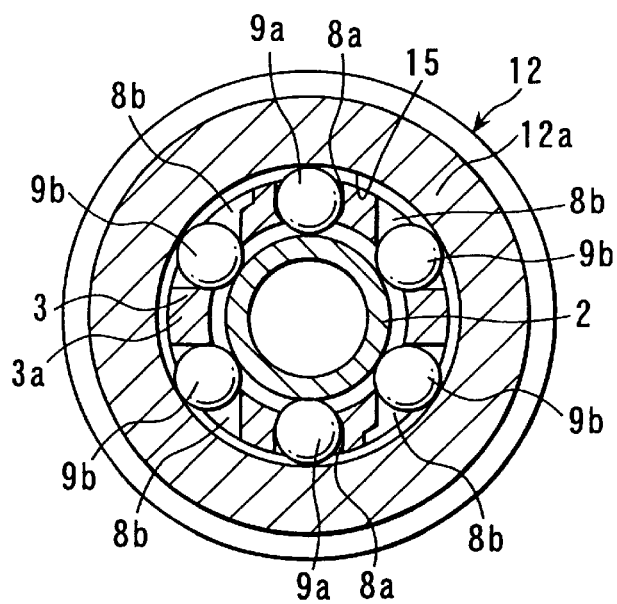
FIG. 6 is a cross-sectional view of the socket taken along line C—C of FIG. 5.
Figure 7:
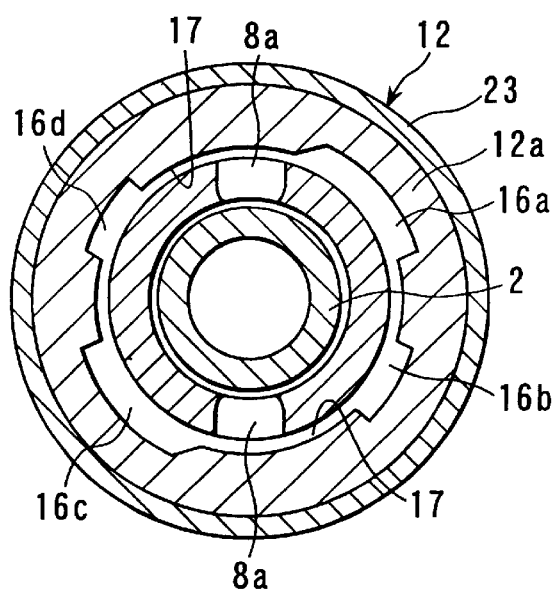
FIG. 7 is a cross-sectional view of the socket taken along line D—D of FIG. 5.
Figure 8:
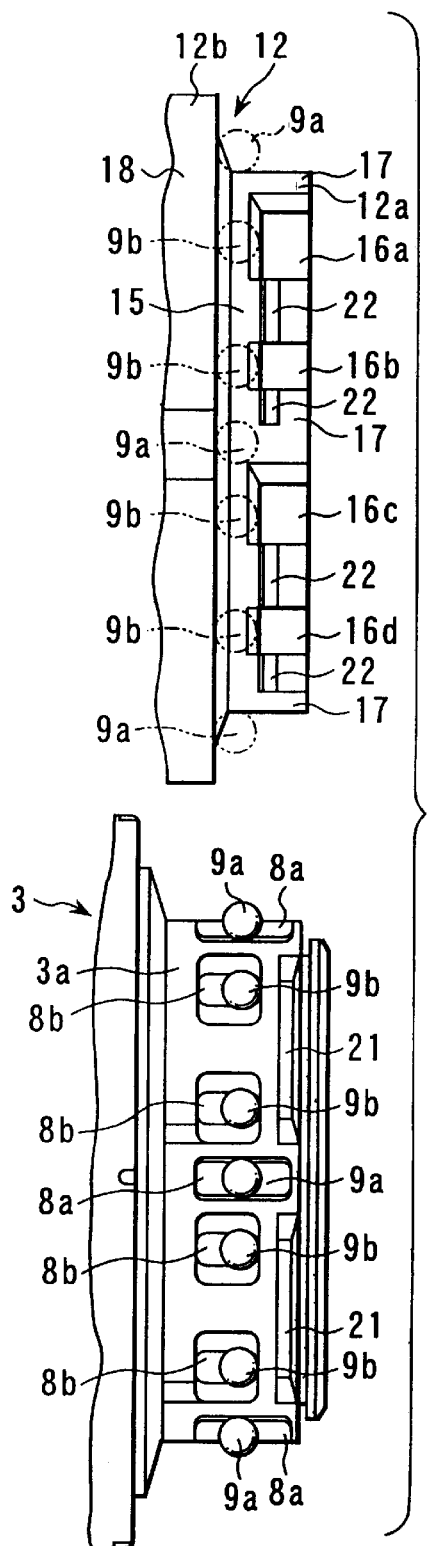
FIG. 8 is a view illustrating the relative positions of the socket, sleeve, and lock balls, obtained by developing the outer peripheral surface of the distal end portion of the socket and the inner peripheral surface of the distal end portion of the sleeve of FIG. 5.
Figure 9:
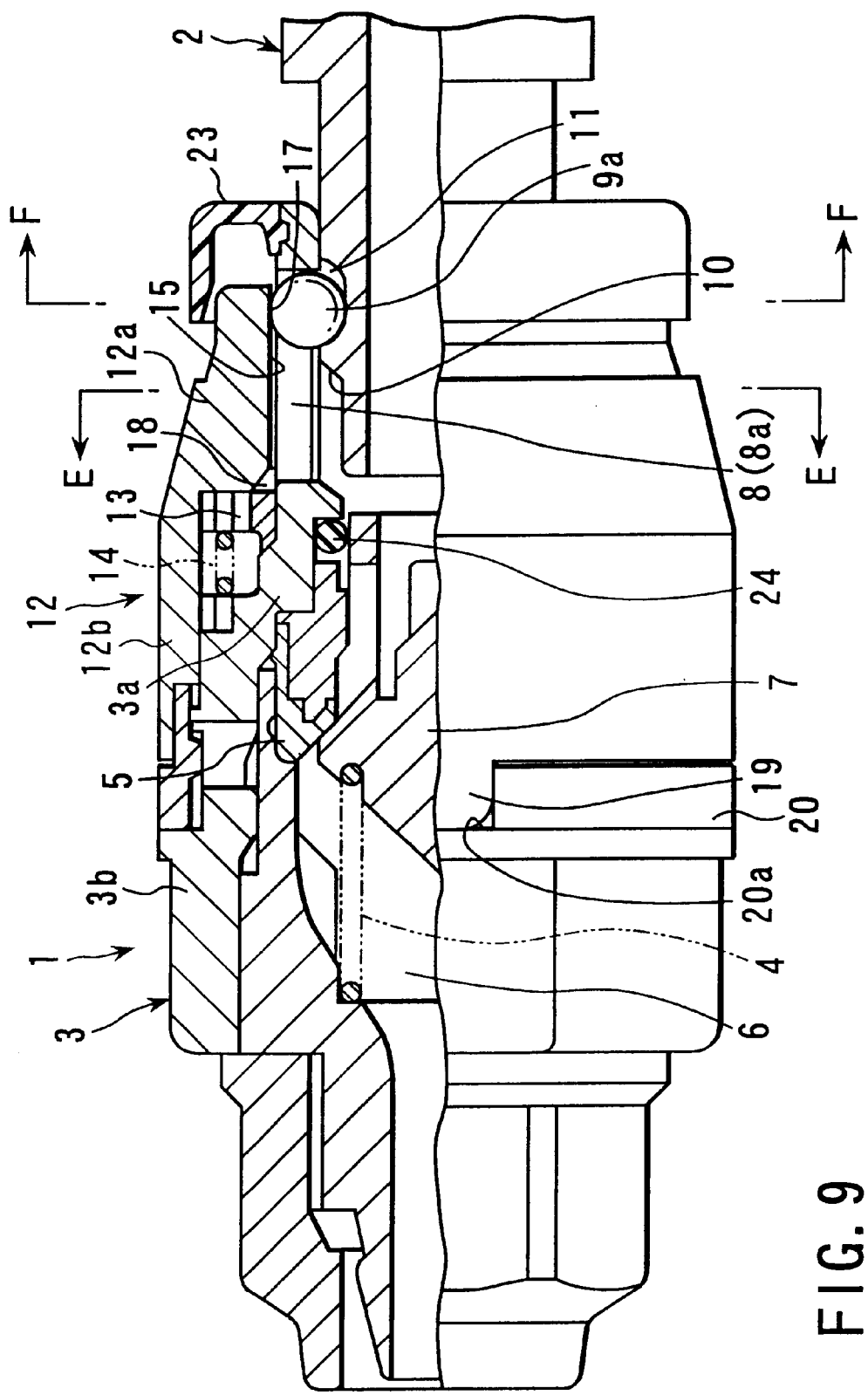
FIG. 9 is a view similar to FIG. 1, showing the process for removing pressure in the pipe coupling as the socket and the plug are separated from each other.
Figure 10:
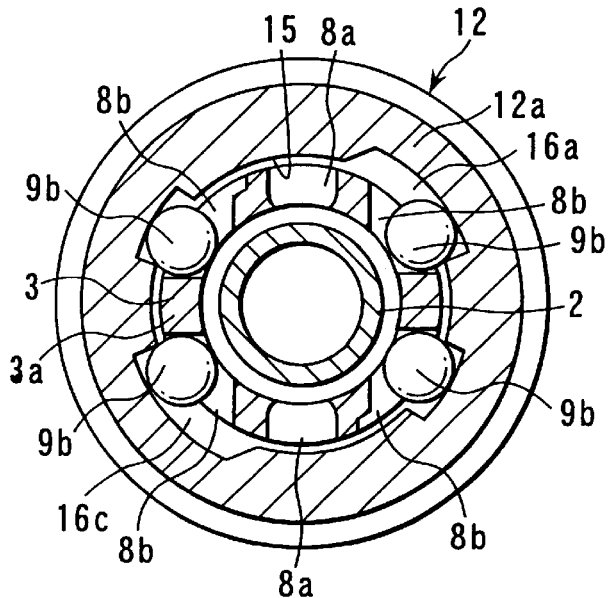
FIG. 10 is a cross-sectional view of the socket fitted with the plug, taken along line E—E of FIG. 9.
Figure 11:
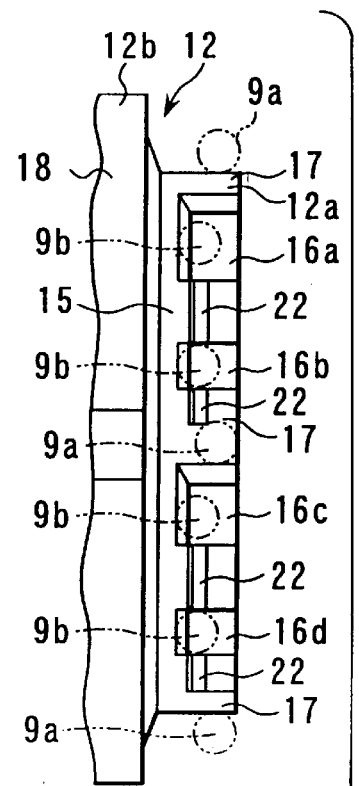
FIG. 11 is a cross-sectional view of the socket fitted with the plug, taken along line F—F of FIG. 9.
Figure 11:
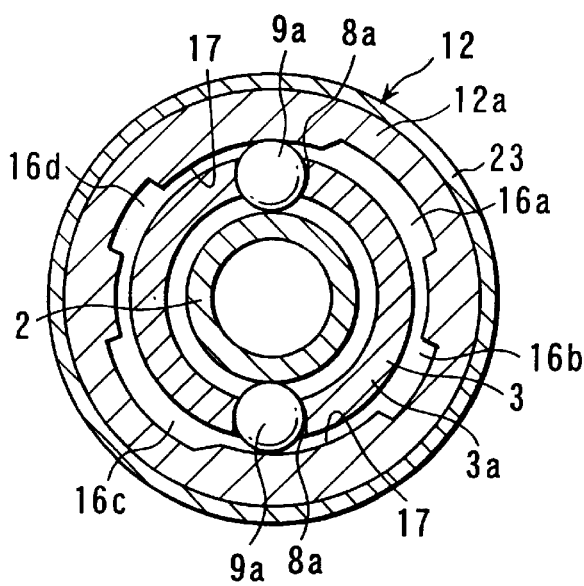
Figure 12:
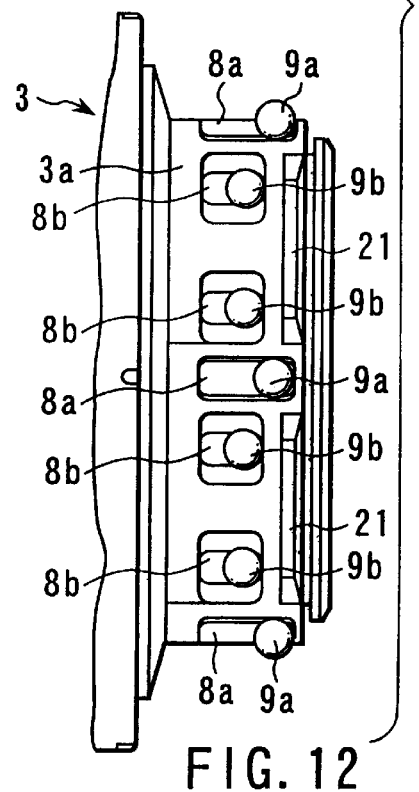
FIG. 12 is a view similar to FIG. 4, illustrating the relative positions of the socket distal end portion, sleeve distal end portion, and lock balls of FIG. 9.
Figure 13:
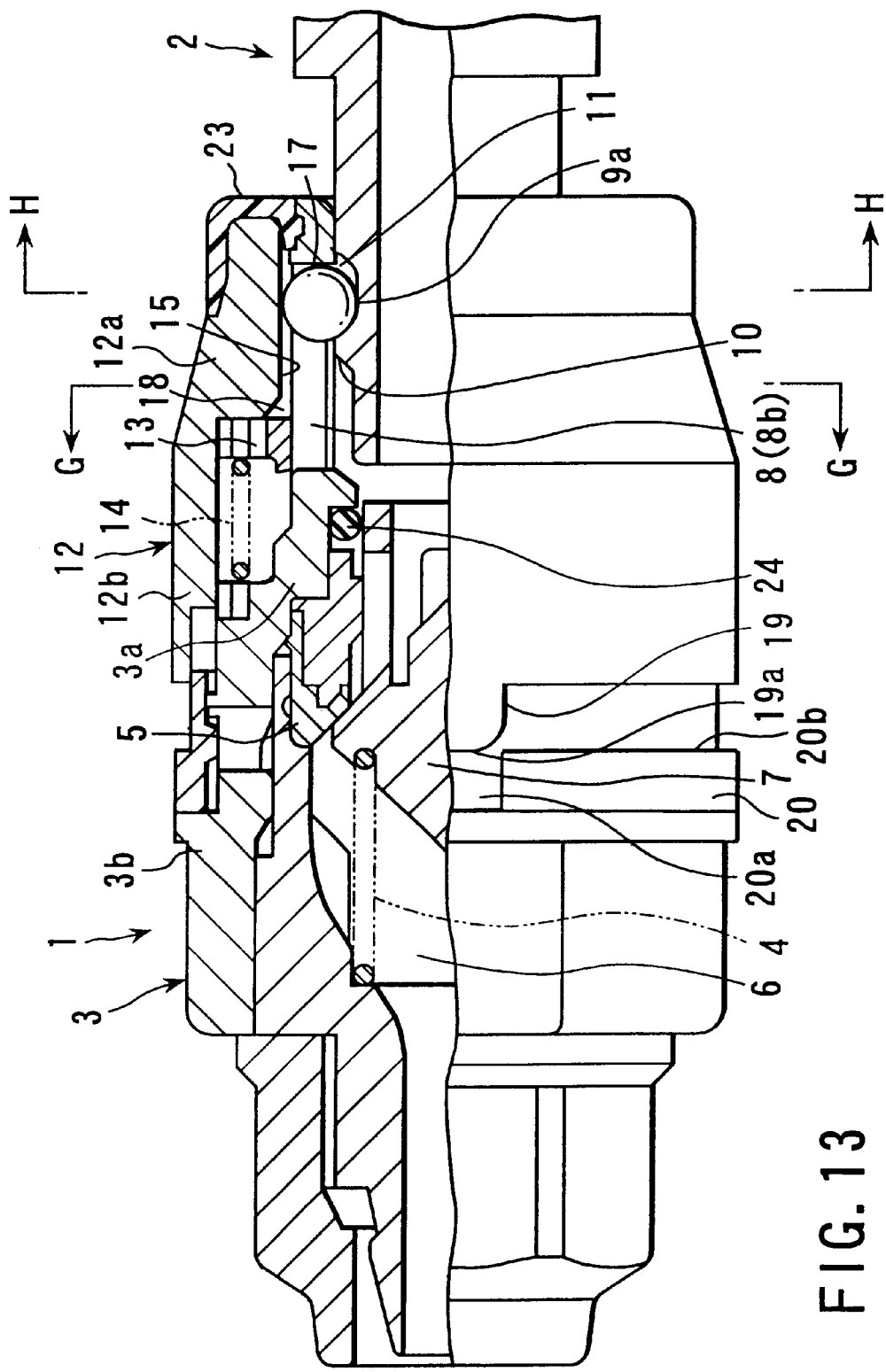
FIG. 13 is a view similar to FIG. 1, showing the sleeve is returned after the pressure in the pipe coupling is removed.
Figure 14:
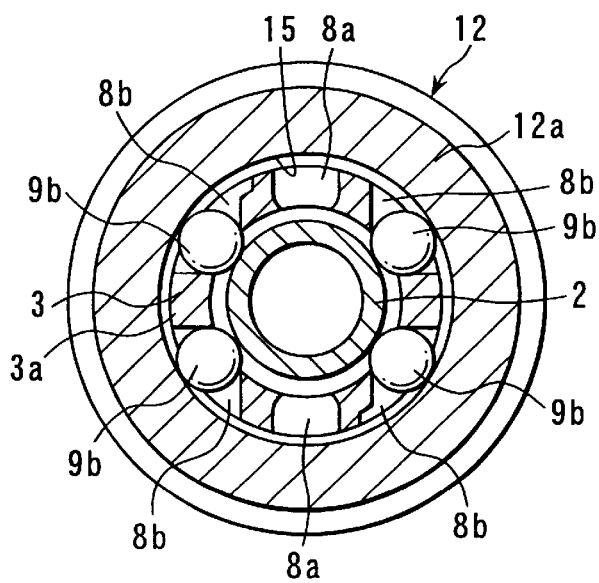
FIG. 14 is a cross-sectional view of the socket fitted with the plug, taken along line G—G of FIG. 13.
Figure 15:
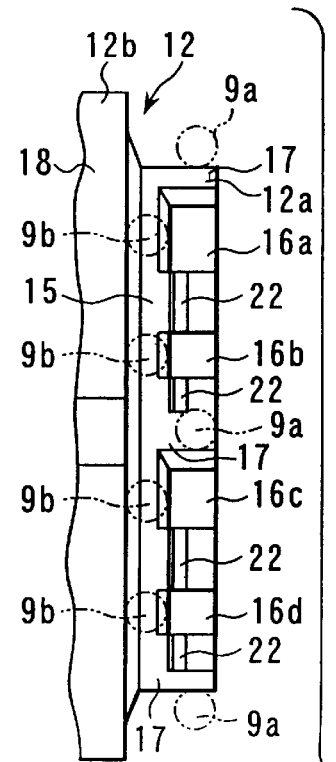
FIG. 15 is a cross-sectional view of the socket fitted with the plug, taken along line H—H of FIG. 13.
Figure 15:
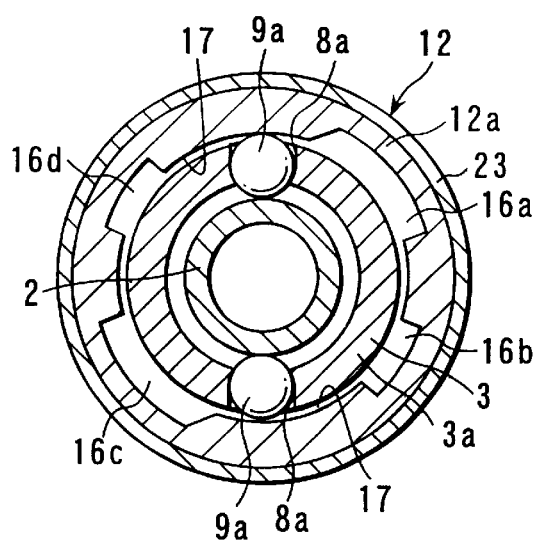
Figure 16:
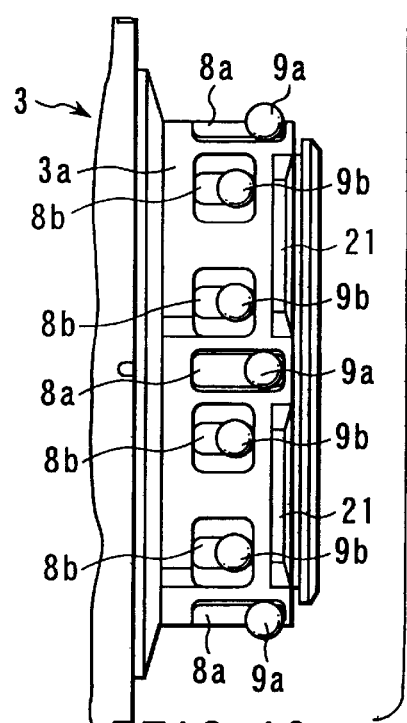
FIG. 16 is a view similar to FIG. 4, illustrating the relative positions of the socket distal end portion, sleeve distal end portion, and lock balls of FIG. 13;.
Figure 17:
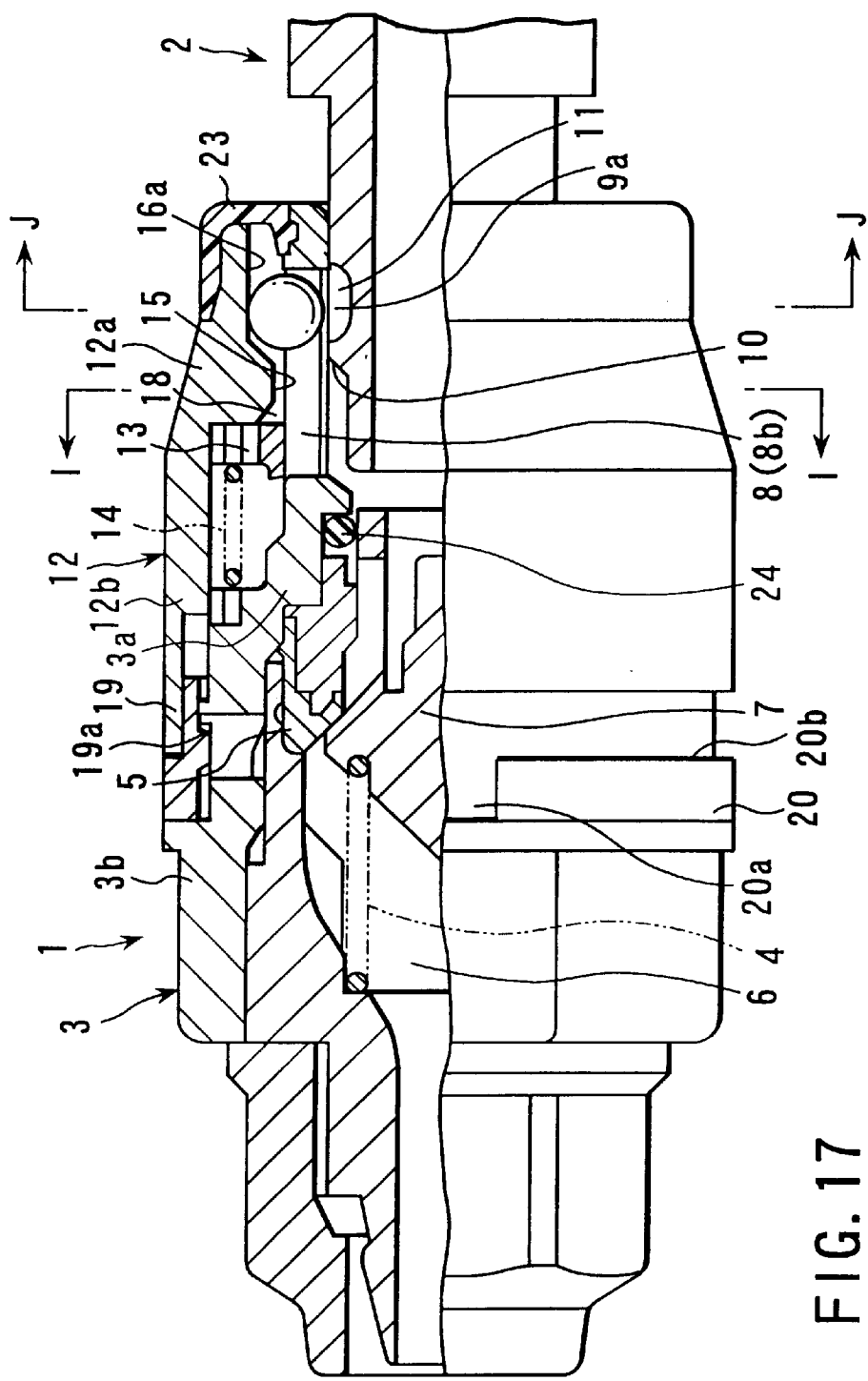
FIG. 17 is a view similar to FIG. 1, showing the state in which the socket and the plug can be separated from each other.
Figure 18:
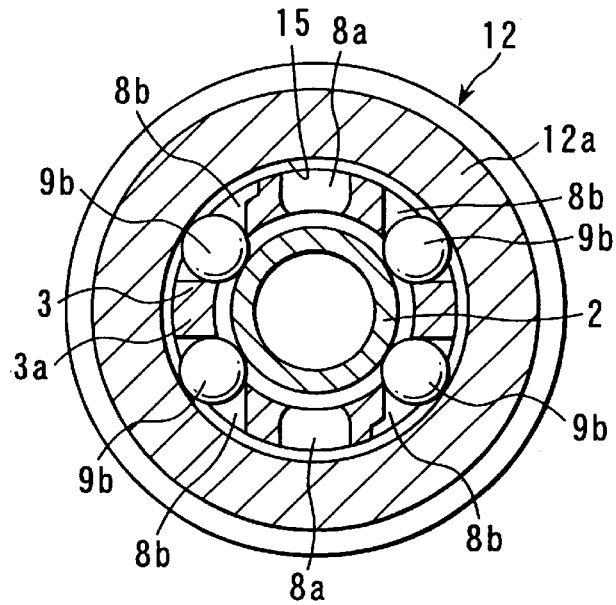
FIG. 18 is a cross-sectional view of the socket fitted with the plug, taken along line I—I of FIG. 17.
Figure 19:
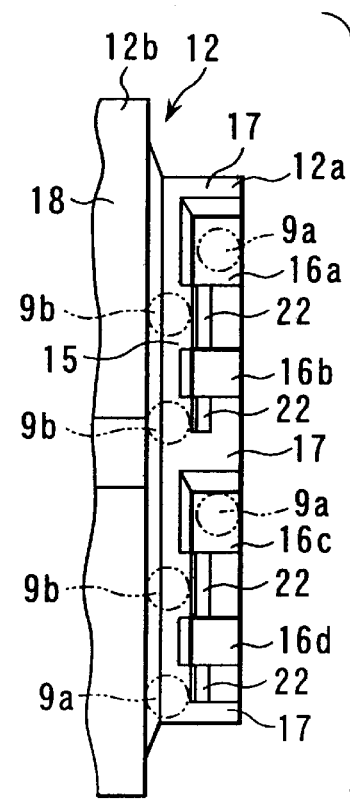
FIG. 19 is a cross-sectional view of the socket fitted with the plug, taken along line J—J of FIG. 17.
Figure 19:
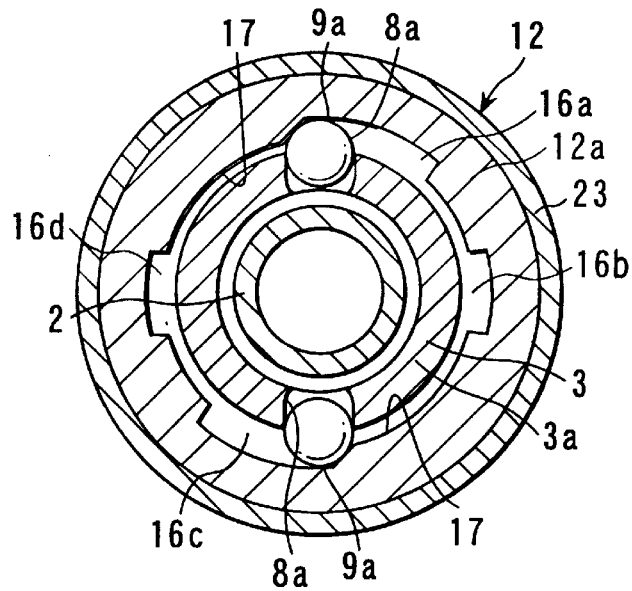
Figure 20:
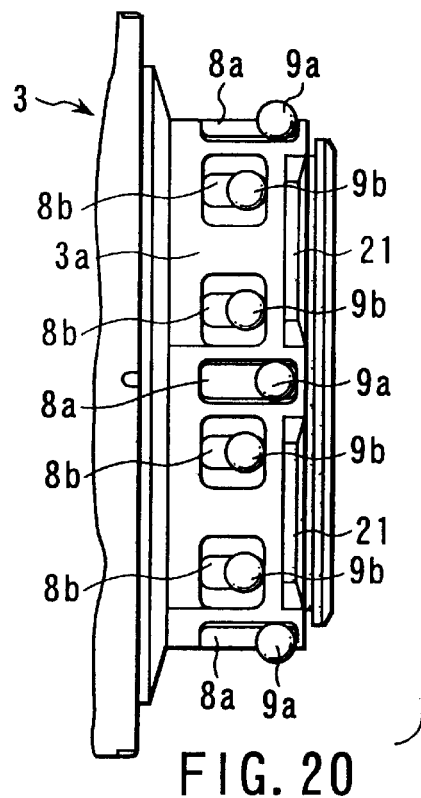
FIG. 20 is a view similar to FIG. 4, illustrating the relative positions of the socket distal end portion, sleeve distal end portion, and lock balls of FIG. 17.

Further, the relative positions of the sleeve 12 and the long lock ball storage holes 8a and the short lock ball storage holes 8b in the small-outside-diameter cylinder portion 3a of the socket body 3 are settled so that the long lock ball storage holes 8a and the short lock ball storage holes 8b overlap both the small-inside-diameter cylinder portion 12a and the large-inside-diameter cylinder portion 12b of the sleeve 12 when the sleeve 12 is in the advanced position, as shown in FIG. 4.

In this state, the rear end portion of the inner peripheral surface of the small-inside-diameter cylinder portion 12a of the sleeve 12 is situated over the lock balls 9b on the distal end side of the long lock ball storage holes 8a. In the same position on the inner peripheral surface of the small-inside-diameter cylinder portion 12a, a convex pressure surface 15 is formed extending in the circumferential direction. The surface 15 serves to press radially inward the lock balls 9a in the long lock ball storage holes 8a that are situated in the same circumferential direction as the lock balls 9b.

Further, concave release surfaces 16a, 16b, 16c and 16d are formed on the inner peripheral surface of the small-inside-diameter cylinder portion 12a of the sleeve 12. If the sleeve 12 in the advanced position is retreated when it is in the given rotating-direction position, the release surfaces move to positions over the lock balls 9b in the short lock ball storage holes 8b, thereby releasing the lock balls 9b by means of the convex pressure surface 15. Furthermore, convex press extension surfaces 17 are integrally formed on the inner peripheral surface of the small-inside-diameter cylinder portion 12a that is situated on the long lock ball storage holes 8a, extending from the convex pressure surface 15 toward the distal end. The surfaces 17 continue to press the lock balls 9a in the long lock ball storage holes 8a radially inward even when the sleeve 12 is retracted.

If the sleeve 12 is rotated against the circumferential urging force of the coil spring 14 when the sleeve 12 is in the advanced position and the lock balls 9a are in the respective distal end portions of the long lock ball storage holes 8a, the concave release surfaces 16a and 16c move to positions over the lock balls 9a, thereby releasing the lock balls 9a from the hold by means of the convex press extension surfaces 17.

Behind the convex pressure surface 15, moreover, a lock ball release space 18 that is continuous with the large-inside-diameter cylinder portion 12b is formed at the rear end of the inner peripheral surface of the small-inside-diameter cylinder portion 12a of the sleeve 12. When the sleeve 12 is in the advanced position, the lock balls 9a and 9b in the long lock ball storage holes 8a and the short lock ball storage holes 8b are pressed by the collar 13 that is urged toward the distal end by means of the coil spring 14. Thereupon, the lock balls 9a move to middle positions in the long lock ball storage holes 8a, the lock balls 9b move to the distal end side of the short lock ball storage holes 8b, and these lock balls 9a and 9b are situated on the convex pressure surface 15. When the lock balls 9a and 9b are pressed to the rear end side as the plug 2 is inserted, moreover, the lock balls 9a and 9b press and retract the collar 13 as they move to the respective rear end sides of the long lock ball storage holes 8a and the short lock ball storage holes 8b. Thus, the lock balls 9a and 9b get into the lock ball release space 18 so that they are released from the hold by means of the convex pressure surface 15.

Further, stoppers 21 and 22 are arranged on the outer periphery of the distal end portion of the small-outside-diameter cylinder portion 3a of the socket body 3 and the inner peripheral surface of the small-inside-diameter cylinder portion 12a of the sleeve 12. They can engage one another to prevent the sleeve 12 from slipping out of the socket body 3. Furthermore, a cover 23 is provided on the distal end of the small-outside-diameter cylinder portion 3a of the socket body 3. It can prevent dust or the like from getting into the space between the socket body 3 and the sleeve 12 and stop the sleeve 12 from slipping out of the socket body 3. A seal ring 24 for sealing the outer periphery of the distal end of the inserted plug 2 is provided on the inner periphery of the socket body 3.

The following is a description of operation for connecting and separating the socket 1 and the plug 2 constructed in this manner.

First, in an unconnected state, the sleeve 12 on the outer periphery of the socket body 3 of the socket 1 is urged to be situated in the advanced position by means of the coil spring 14 through the medium of the collar 13. In this state, the lock balls 9a and 9b in the long lock ball storage holes 8a and the short lock ball storage holes 8b are pushed by the collar 13 that is urged toward the distal end by the coil spring 14. Thereupon, the lock balls 9a move to the middle positions in the long lock ball storage holes 8a, and the lock balls 9b move to the distal end side of the short lock ball storage holes 8b. Thus, they are located in positions aligned with the convex pressure surface 15 and the convex press extension surfaces 17 on the inner peripheral surface of the small-inside-diameter cylinder portion 12a of the sleeve 12, and are pressed radially inward. Further, the valve body 7 that is located in the socket body 3 is urged toward the distal end by means of the spring 4 and abuts against the valve seat 5, thereby closing the fluid passage 6 (see FIGS. 1 to 4).

If the plug 2 is inserted into the socket 1 in this state, the ring-shaped tapered end face 10 that is formed on the distal-end-side outer peripheral surface of the plug 2 abuts against the lock balls 9a and 9b that partially project from the inner surface of the small-outside-diameter cylinder portion 3a of the socket body 3. As the plug 2 advances, the lock balls 9a and 9b move to the respective rear end sides of the long lock ball storage holes 8a and the short lock ball storage holes 8b, and get into the lock ball release space 18, retracting the collar 13. Thus, the lock balls 9a and 9b move radially outward and are disengaged from the ring-shaped tapered end face 10 of the plug 2. When the engaging groove 11 on the outer periphery of the plug 2 is aligned with the lock balls 9a and 9b as the plug 2 continues to be inserted, the lock balls 9a and 9b are pressed by the collar 13 to engage the engaging groove 11.

As this is done, the distal end of the plug 2 presses and retracts the valve body 7 against the urging force of the spring 4, thereby allowing the fluid passage 6 to open. If the force in the direction of insertion of the plug 2 is removed in this state, the plug 2 is retracted by the urging force of the spring 4 that urges the valve body 7. Accompanying the plug 2, the lock balls 9a and 9b that are in engagement with the engaging groove 11 of the plug 2 move toward the distal end, and move onto the convex pressure surface 15 of the sleeve 12, whereupon it is pressed radially inward by means of the convex pressure surface 15. When the lock balls 9b, among the lock balls 9a and 9b, engage the respective distal end portions of the short lock ball storage holes 8b, the plug 2 is stopped from retreating further, whereupon the connection between the socket 1 and the plug 2 is completed (see FIGS. 5 to 8).

As this is done, the sleeve 12 is urged by the coil spring 14 to be situated in the advanced position. Although the sleeve 12 can rotate in the circumferential direction in this state, all the lock balls 9a and 9b are in engagement with the engaging groove 11 of the plug 2 and are pressed radially inward by the convex pressure surface 15. Since the convex pressure surface 15 extends in the circumferential direction, the lock balls 9a and 9b can never be disengaged from the convex pressure surface 15 if the sleeve 12 is rotated. Since the lock balls 9b, among the lock balls 9a and 9b, engage the respective distal end portions of the short lock ball storage holes 8b, the socket 1 and the plug 2 cannot be separated from each other.

In separating the socket 1 and the plug 2 connected in this manner, the sleeve 12 in the aforesaid state is retracted, whereupon the concave release surfaces 16a, 16b, 16c and 16d on the inner peripheral surface of the small-inside-diameter cylinder portion 12a of the sleeve 12 move onto the lock balls 9b in the short lock ball storage holes 8b. Thus, the lock balls 9b are released from the hold by means of the convex pressure surface 15.

If the plug 2 in this state is pressed in the separating direction by the pressure of a fluid remaining in the plug 2, the lock balls 9b having so far been in engagement with the engaging groove 11 of the plug 2 are pressed radially outward by a ring-shaped surface on the distal end side (surface axially opposite from the ring-shaped tapered end face 10) that defines the engaging groove 11, and move into the concave release surfaces 16a, 16b, 16c and 16d. Thereupon, the lock balls 9b are disengaged from the engaging groove 11, and the plug 2 retreats. As this is done, however, the lock balls 9a, which, along with the lock balls 9b, are in engagement with the engaging groove 11 and are stored in the long lock ball storage holes 8a, are pressed radially inward by the convex press extension surfaces 17 and are in engagement with the engaging groove 11.

When the lock balls 9a, along with the plug 2, move toward the distal end of the socket body 3 and engage the respective distal end portions of the long lock ball storage holes 8a, the plug 2 is prevented from further retreating or moving in the separating direction. Thus, the socket 1 and the plug 2 are kept connected. When the plug 2 is drawn out to the aforesaid position from the socket 1, the distal end of the plug 2 leaves the valve body 7 in the socket 1. Thereupon, the valve body 7 is urged by the spring 4 to advance and abut against the valve seat 5, thereby closing the fluid passage 6 in the socket 1. The fluid remaining in the plug 2 is discharged to the outside through the gap between the socket 1 and a lock mechanism of the plug 2 (see FIGS. 9 to 12).

If the retracted sleeve 12 is released in this state, the sleeve 12 is advanced by means of the urging force of the coil spring 14 and reaches the advanced position. The socket 1 and the plug 2 are kept connected, and the fluid in the plug 2 goes on being discharged to the outside (FIGS. 13 to 16).

If the sleeve 12 in this state is rotated in the circumferential direction against the circumferential urging force of the coil spring 14, moreover, the concave release surfaces 16a and 16c of the sleeve 12 move onto the lock balls 9a, thereby releasing the lock balls 9a from the hold by means of the convex press extension surfaces 17. If the plug 2 in this state is pulled from the socket 1, the lock balls 9a having so far been in engagement with the engaging groove 11 of the plug 2 are pressed radially outward by the ring-shaped surface that defines the engaging groove 11 on the distal end side, and move to the concave release surfaces 16a and 16c to be disengaged from the engaging groove 11. Thus, the plug 2 can be drawn out and separated from the socket 1 (see FIGS. 17 to 20).

If the rotating sleeve 12 is released after the plug 2 is drawn out of the socket 1, the sleeve 12 is returned to the given rotating-direction position by means of the circumferential urging force of the coil spring 14, whereupon the state shown in FIG. 1 is established.

According to the pipe coupling of the present invention, as described above, the fluid in the plug can be discharged to ensure safe separation before the socket and the plug are separated if the fluid remains in the plug as the socket and the plug are separated from each other. In addition, the construction is simple, and the number of components is smaller than in the case of a conventional pipe coupling of this type. Thus, the manufacture is easy, and the cost can be reduced. Since the operation is simple, moreover, the working efficiency can be improved.

If the pipe coupling is used in any pneumatic machines including pneumatic striking tools such as a riveting machine and an air hammer, in particular, the safety of use of these working machines can be improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pipe coupling comprising:

a socket including a socket body having a valve body for opening and closing a fluid passage formed therein and a distal end portion having a plurality of holes arranged at spaces in the circumferential direction, a plurality of lock balls stored in the holes for radial sliding motion, and a sleeve fitted on the outer periphery of the socket body, having a convex pressure surface and concave release surfaces on the inner peripheral surface thereof, and adapted to press said lock balls radially inward by means of the convex pressure surface when in an advanced position and to release the lock balls from the hold by means of the concave release surfaces when in a retreated position; and a plug having a distal end portion formed having an engaging groove in which said lock balls can be fitted and adapted to move said valve body to open the fluid passage so that engagement with the socket can be maintained by means of the lock balls in engagement with the engaging groove when the distal end portion is fitted in the distal end portion of the socket, the holes in the distal end portion of said socket including first and second holes individually extending in the axial direction, the first holes extending closer to the distal end side than the second holes, said sleeve being rotatable over the socket body, having convex press extension surfaces extending from said convex pressure surface toward the distal end, and being adapted to press the lock balls on the distal end side of the first holes by means of the convex press extension surfaces when in a given rotating-direction position and to align the lock balls with said concave release surfaces, thereby releasing the lock balls from the hold by means of the convex press extension surfaces, when rotated from the given position, said valve body being adapted to be released from the engagement with the plug and allowed to return to a position such that the fluid passage is closed when said plug is moved away from the socket so that the lock balls in engagement with said engaging groove are located on the extreme distal end side of said first holes.

2. A pipe coupling according to claim 1, wherein said sleeve is movable in the axial direction only when in said given rotating-direction position and rotatable only when in the advanced position.

3. A pipe coupling according to claim 1, wherein said first holes include a pair of diametrically opposed holes.

4. A pipe coupling according to claim 1, wherein said second holes include two pairs of diametrically opposed holes.

5. A socket comprising, in order to constitute a pipe coupling in conjunction with a plug having an engaging groove formed in the distal end portion thereof: a socket body having a valve body for opening and closing a fluid passage formed therein and a distal end portion having a plurality of holes arranged at spaces in the circumferential direction; a plurality of lock balls stored in the holes for radial sliding motion; and a sleeve fitted on the outer periphery of the socket body, having a convex pressure surface and concave release surfaces on the inner peripheral surface thereof, and adapted to press said lock balls radially inward by means of the convex pressure surface when in an advanced position and to release the lock balls from the hold by means of the concave release surfaces when in a retreated position, said valve body being adapted to be moved to open the fluid passage when said plug is fitted in said distal end portion, thereby holding the plug by means of the lock balls in engagement with the engaging groove, the holes in said distal end portion including first and second holes individually extending in the axial direction, the first holes extending closer to the distal end side than the second holes, said sleeve being rotatable over the socket body, having convex press extension surfaces extending from said convex pressure surface toward the distal end, and being adapted to press the lock balls on the distal end side of the first holes by means of the convex press extension surfaces when in a given rotating-direction position and to align the lock balls with said concave release surfaces, thereby releasing the lock balls from the hold by means of the convex press extension surfaces, when rotated from the given position, said valve body being adapted to be released from the engagement with the plug and allowed to return to a position such that the fluid passage is closed when said plug is moved away from the socket so that the lock balls in engagement with said engaging groove are located on the extreme distal end side of said first holes.

6. A socket according to claim 5, wherein said sleeve is movable in the axial direction only when in said given rotating-direction position and rotatable only when in the advanced position.

7. A socket according to claim 5, wherein said first holes include a pair of diametrically opposed holes.

8. A socket according to claim 5, wherein said second holes include a pair of diametrically opposed holes.

* * * * *